United States Patent [19]

McClellan

[11] 4,199,855

[45] Apr. 29, 1980

[54] PLASTIC DUST TUBE FOR SHOCK ABSORBER AND METHOD OF MANUFACTURE

[75] Inventor: Alan J. McClellan, Germantown, Ohio

[73] Assignee: General Motors Corporation, Detroit, Mich.

[21] Appl. No.: 961,522

[22] Filed: Nov. 17, 1978

Related U.S. Application Data

[62] Division of Ser. No. 915,146, Jun. 14, 1978, Pat. No. 4,167,992.

[51] Int. Cl.² .............................................. B23P 11/02
[52] U.S. Cl. ......................................... 29/450; 29/453; 29/455 R
[58] Field of Search ..................... 29/453, 451, 455 R, 29/450; 188/322; 220/306, 307

[56] References Cited

U.S. PATENT DOCUMENTS

| | | | |
|---|---|---|---|
| 1,239,223 | 9/1917 | Ross | 220/306 |
| 2,653,683 | 9/1953 | Strauss | 29/451 X |
| 2,799,971 | 7/1957 | Brudney | 29/453 X |
| 2,814,159 | 11/1957 | Green | 29/453 UX |
| 3,250,077 | 5/1966 | Ede | 29/453 X |
| 3,830,347 | 8/1974 | Fader et al. | 188/322 |
| 3,849,863 | 11/1974 | Schwartzman | 29/450 X |
| 3,907,080 | 9/1975 | Chadwick | 188/322 |
| 3,967,363 | 7/1976 | Meyer | 29/455 R X |

FOREIGN PATENT DOCUMENTS 1083382  9/1967  United Kingdom .
1131985 10/1968  United Kingdom ..................... 188/322

Primary Examiner—Charlie T. Moon
Attorney, Agent, or Firm—Charles R. White

[57] ABSTRACT

Telescopic shock absorber having a cup-like metallic cover plate with a cylindrical rim having a series of arcuately spaced and inwardly projecting dust tube retainer tabs. The dust tube is formed from a generally rectilinear blank of flexible plastic material having a series of holes punched along the upper edge thereof spaced to match the retainer tabs. The blank is curled into cylindrical tube that is subsequently inserted into the cover plate and turned until the retainer tabs enter corresponding holes in the upper end of the tube so that the tube is fixed to the cover plate.

2 Claims, 8 Drawing Figures

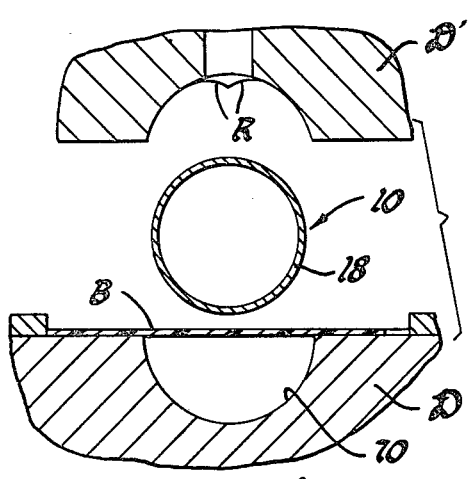 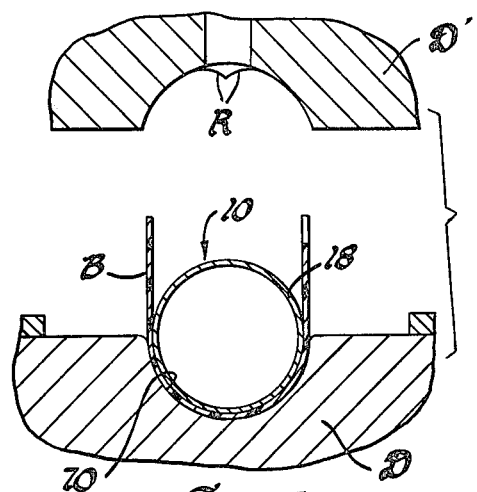 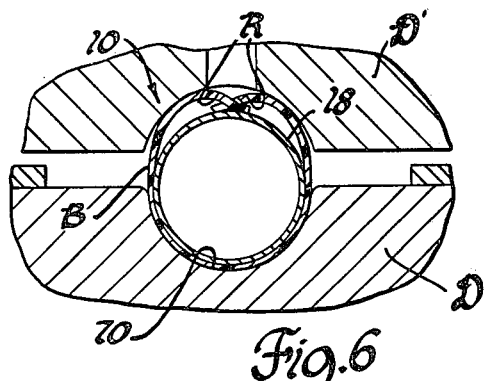 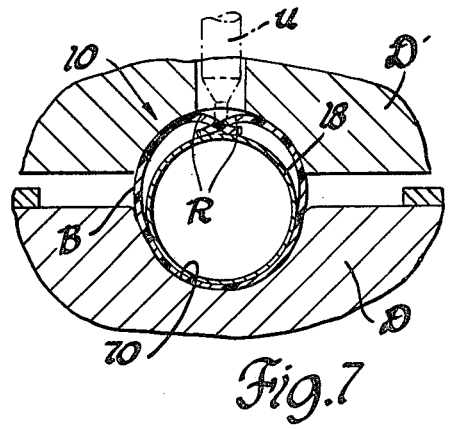 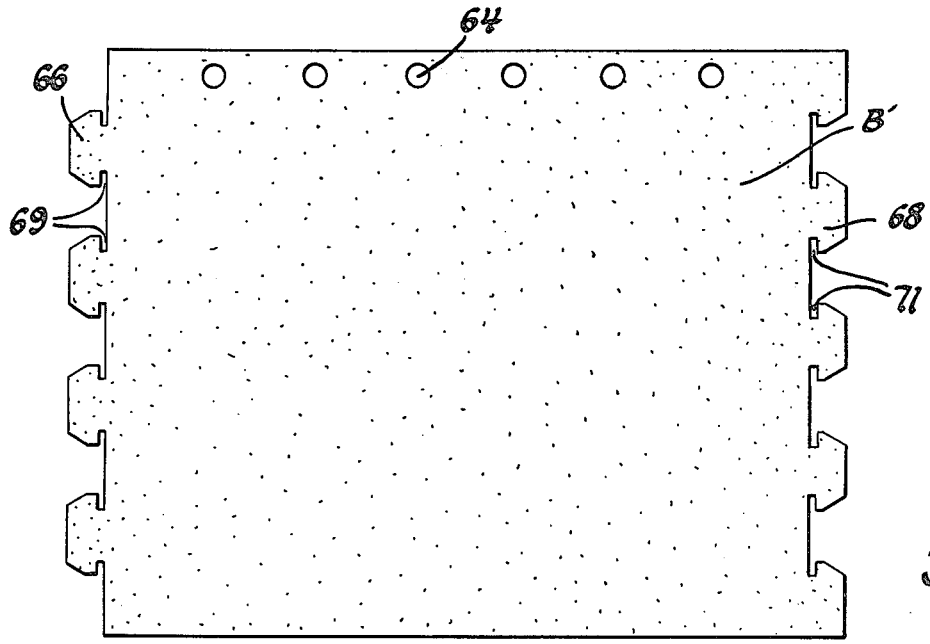

PLASTIC DUST TUBE FOR SHOCK ABSORBER AND METHOD OF MANUFACTURE

This is a division of application Ser. No. 915,146, filed June 14, 1978, now U.S. Pat. No. 4,167,992 issued Sept. 18, 1979.

This invention relates to shock absorbers and more particularly to a new and improved plastic dust tube and metallic cover plate assembly for a shock absorber for vehicles and to a new and improved method of curling and attaching a plastic dust tube to the shock absorber cover plate.

In the preferred embodiment of this invention, the dust tube is formed from a sturdy and flexible thermoplastic material such as polypropylene stock in individual sheet form. Such stock can be produced economically by well known extrusion or rolling methods and stamped into generally rectilinear blanks. In this invention, the dust tube blank preferably has a plurality of equally spaced openings along one edge thereof so that they will receive retainer tabs struck radially inwardly from an outer rim of a metallic cover plate. If desired, the opposite side edges of the blank could be formed with spaced tabs which interlace or interlock with one another when the blank is curled into a tube. A pair of special dies can be employed to curl the blank around the outer periphery of a shock absorber so that the tabs interlace with one another. Using the shock absorber as a backing, the mating and overlapping parts of the curled blank can be seam welded ultrasonically or by other suitable means to complete the dust tube. After being welded, the shock and dust tube are removed from the dies and the dust tube is forced axially into the cover plate and turned until the retainer tabs enter the openings at the upper edge thereof.

With this invention, a new and improved wrapped and seamed plastic dust tube is provided for a hydraulic shock absorber for vehicles to reduce weight and costs. This plastic dust tube allows the shock absorber components to be fully assembled prior to dust tube assembly. With the plastic dust tube fitting into the end cap, external fasteners and projections are eliminated. Furthermore, the shock absorber may be completed and treated with rust preventitives prior to insertion of the dust tube into the cap. The dust tube of this invention can be used with various types and sizes of shock absorbing mountings and prevents metal to metal contact between the shock absorber reservoir tube and surrounding suspension springs.

These and other features, objects and advantages of this invention will be more apparent from the following detailed description and drawings in which:

FIGS. 4, 5, 6 and 7 are diagrammatic end views illustrating the method in which the dust tube is installed around the exterior of a cylindrical shock absorber; and FIG. 8 is a top plan view of a second embodiment of the dust tube blank.

Figure 1:
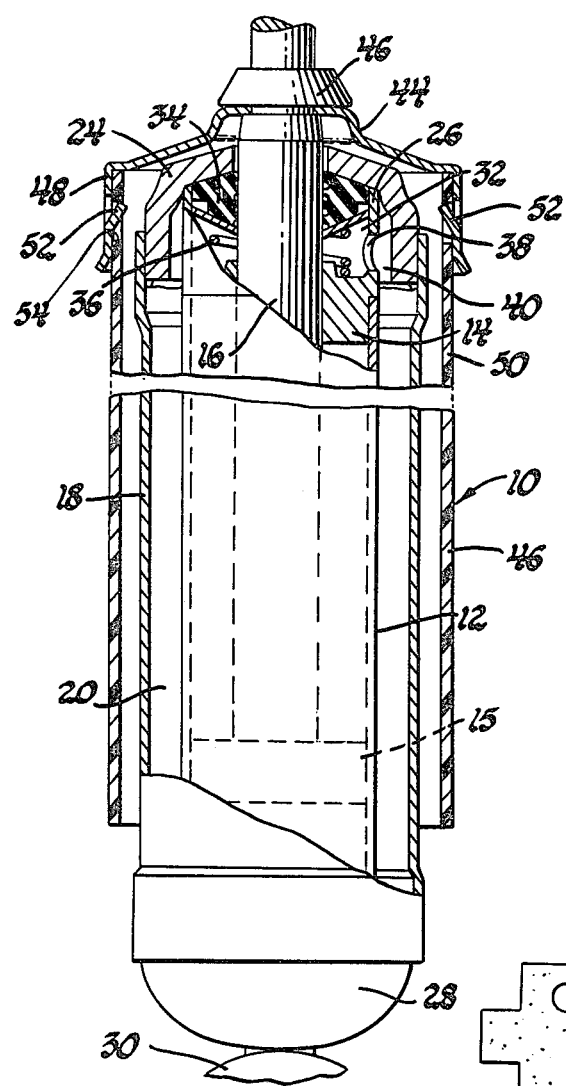
FIG. 1 is a vertical side view partly in cross section of a telescopic shock absorber for a vehicle having a metallic cover plate and plastic dust tube.

As shown in FIG. 1, there is a shock absorber 10 having an interior pressure cylinder 12 closed at its upper end by a rod guide 14. The pressure cylinder receives a reciprocally movable piston 15 which is carried on the end of the piston rod 16 that extends upwardly through the rod guide 14 and outwardly from the upper end of the shock absorber 10. The upper end of the piston rod carries a conventional mounting, not shown, for attachment with a spring portion of a vehicle.

A reservoir tube 18 surrounds and is radially spaced from the pressure cylinder 12 to form a reservoir 20 for hydraulic fluid employed as the damping medium of the shock absorber. The upper end of the reservoir tube 18 has a cup-like end cap 24 secured thereto which seats against the upper cylindrical end 26 of the rod guide 14. The opposite end of the reservoir tube 18 is closed by a cap 28 having a mounting ring 30 fastened thereto for vehicular attachment to an unsprung portion of a vehicle.

Figure 2:
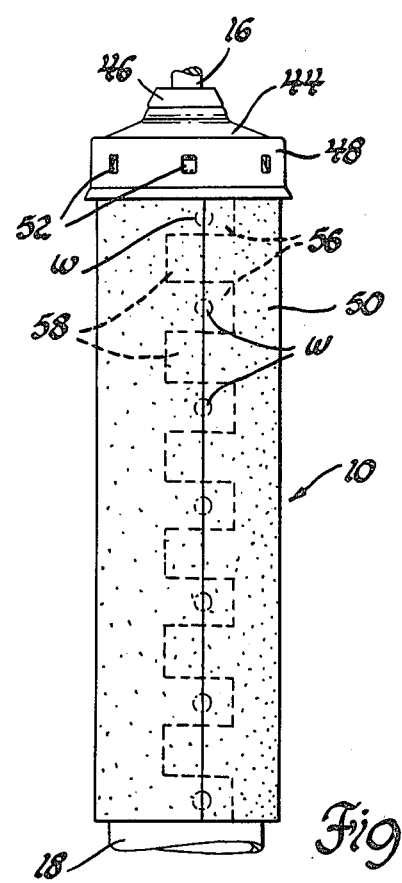
FIG. 2 is a side elevational view of the shock absorber of FIG. 1.

The upper end of rod guide 14 has a chamber 32 receiving a resilient elastomer rod seal 34 held under compression by helical spring 36 disposed between the rod guide and the lower end of the rod seal. The seal chamber 32 is hydraulically connected to the reservoir 20 through an opening 38 formed in the rod guide and one or more passages 40 formed between the end cap 24 and the outer periphery of the rod guide 14. The piston rod 16 extends through the rod seal 34 and end cap 24 and carries a cup-like metallic cover plate 44 secured thereto by welded collar 46. The cover plate has an annular downwardly-extending rim 48 forming a receptacle for the upper end of a cylindrical flexible dust tube 50 of polypropylene or other suitable plastic which extends downwardly and around the reservoir tube as shown in FIGS. 1 and 2. The cover plate and dust tube assembly shields and protects the components interior thereof from dust, dirt, stones or other road hazards. The cover plate has a plurality of arcuately spaced tabs 52 lanced inwardly from the annular rim 48 for attachment of the dust tube.

Figure 3:
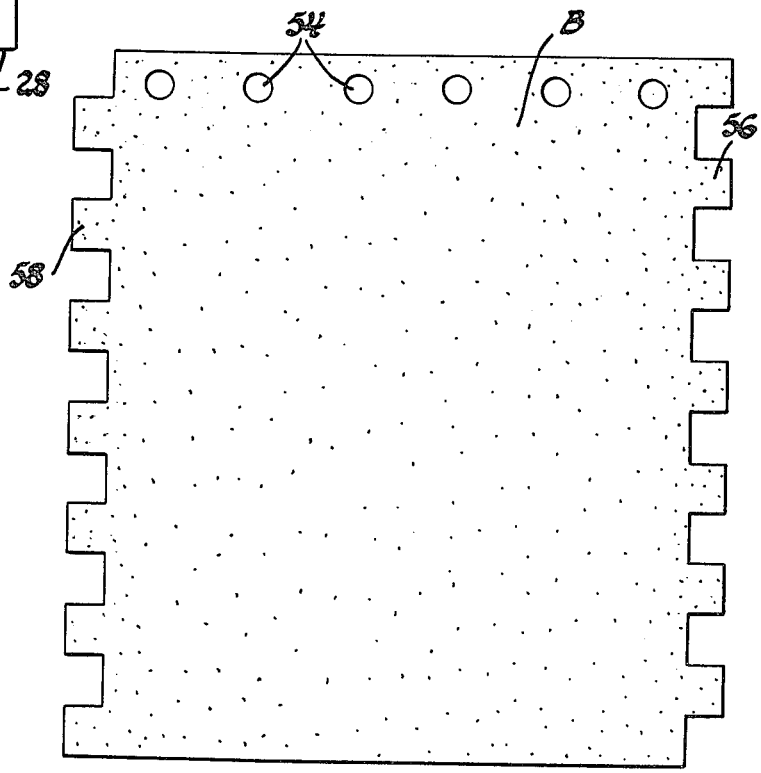
FIG. 3 is a top plan view of a first embodiment of a dust tube blank.

FIG. 3 illustrates the flexible plastic sheet stock or blank B used to form the dust tube. The blank has a series of laterally spaced circular openings 54 punched or otherwise formed adjacent to the upper edge thereof. These openings are sized and spaced to receive the retainer tabs 52 once the stock or blank B is curled into its tubular formation and inserted endwise into the cover plate. To facilitate joining the side edges of the blank B, each of the side edges are preferably formed with a series of spaced tabs 56 and 58 respectively. In addition to being spaced, the side edge tabs 56 and 58 are offset with respect to one another so that they will interlace with each other as shown in FIG. 2 when the blank is curled into its tubular form. After being curled, the tabs 56 and 58 are welded ultrasonically as indicated by weldments W to the underlying portion of the tube. Once the tube 50 is curled and welded, it can be inserted axially into the cap 44 and turned until the retainer tabs 52 enter the circular openings 54 formed in the upper edge of the blank. With the tabs 51 extending through the circular opening as shown in FIG. 1, the plastic dust tube will be retained in position.

Instead of being formed from the blank B of FIG. 3, the dust tube could be readily formed by blank B' of FIG. 8. This blank is similar to blank B in that it has circular openings 64 adjacent to the upper edge thereof and has a series of spaced side tabs 66 and 68 extending from opposite side edges thereof. Tabs 66 and 68, undercut at 69 and 71, are offset from one another. With this construction, the tabs 66 and 68 can fit into their respective undercuts so that the blank can be locked in its tubular formation after it has been curled. While not required, the curled blank B could be ultrasonically welded as described above or taped or otherwise secured so that the side edges are more positively fastened to one another. After being fastened in a suitable manner such as described above, the dust tube is axially inserted into the end cap and rotated. The upper end of the dust tube is deflected by the retainer tabs of the cover plate until they find the retainer holes 64 and secure the dust tube in position.

FIGS. 4–7 diagrammatically illustrate a preferred method for curling the dust tube around the cylindrical reservoir tube of the shock absorber and for fastening the ends of the dust tube together at the mating edges. As shown in FIG. 4, the flat blank B or B' is fed onto a lower die D which is spaced vertically from an upper die D'. The lower die D is formed with a semi-cylindrical recess 70 which underlies the blank for accommodating the shock absorber which at this time is completely assembled with the exception of the dust tube. The shock absorber is fed downwardly from its intermediate position between dies D and D' by suitable feeder mechanisms, not shown, to the FIG. 5 position. As the shock absorber enters the recess 70, the blank B is forced into the recess 70 and the side edges of the blank will extend upwardly so that the blank generally has a U-shaped conformation in cross section. The upper die D' is subsequently moved downwardly towards die D. As this movement progresses, the side edges of the dust tube are forced toward one another. The upper die is formed with ramps R which correspond to the tabs 56, 58 or 66, 68 which turn the tabs inwardly as best shown in FIG. 6 so that they interlace with one another. After the tabs are interlaced with one another, suitable welding units U are introduced through openings in the upper die D and the overlapped portions of the blank are welded together. It will be seen that the reservoir tube is used as a backing for this procedure. After being welded, the welding units are removed and the dies opened so that the part with the dust tube surrounding the reservoir can be removed from the dies. After removal, the dust tube is inserted axially into the end cap and fastened thereto as previously stated.

It will be appreciated while this invention has been described with tabs on the side edges of the blanks for interlacing, the device could be made by curling so that straight edges overlap and join by a suitable seam welding.

This invention is not limited to the particular details of construction and the method shown and described for purposes of illustrating the invention for other modifications and method falling within the scope of the appended claims will occur to those skilled in the art.

I claim:

1. A method of making and attaching a plastic dust tube to a cylindrical shock absorber having an annular cover plate attached to the piston rod of the shock absorber comprising the steps of inserting a flat flexible blank of plastic material and a predetermined rectangular conformation on a support, locating a shock absorber immediately above said plastic blank, moving said shock absorber relative to said support and into contact with said blank to thereby deflect said blank so that it extends around a portion of said shock absorber and so that opposite side portions thereof project upwardly and said blank bends into a generally U-shaped cross sectional configuration, curling the upwardly projecting side portions onto one another until the edges of said side portions are adjacent to one another, securing said side portions with finger-like tabs on each side interlaced to one another adjacent to the edges thereof to thereby form a tubular member, removing said shock absorber and said tubular member from said support, and axially moving said tubular member into said cover plate and attaching said tubular member to said cover plate by means of radially inwardly extending tabs on said cover plate deflecting said tubular member to seat said tabs into openings in the end of the tubular member.

2. A method of making and attaching a plastic dust tube to a cylindrical shock absorber having an annular cover plate having an outer annular rim with integral tabs extending radially inwardly therefrom and with the cover plate centrally attached to the piston rod of the shock absorber comprising the steps of inserting a flat plastic blank of a predetermined rectangular conformation and having a plurality of openings corresponding to said integral tabs along an upper edge thereof on a support, locating a shock absorber immediately above said plastic blank, moving said shock absorber relative to said support and said blank to thereby directly contact and deflect said blank so that it extends around a portion of said shock absorber and so that opposite sides thereof project upwardly and said blank assumes a generally U-shaped cross sectional configuration, curling the upwardly projecting sides onto one another until said sides are closely adjacent to one another, securing said side edges with finger-like tabs on each side interlaced to one another to thereby form a tubular member, removing said shock absorber and said plastic tubular member from said support, and axially moving said tubular member into said cover plate and forcing said tabs to deflect said tubular member and seat said tabs into said openings to thereby attach said tubular member to the inside of said rim of said cover plate.

* * * * *